US007907957B2

(12) United States Patent
Danzeisen et al.

(10) Patent No.: US 7,907,957 B2
(45) Date of Patent: Mar. 15, 2011

(54) METHOD AND SYSTEM FOR TRANSMITTING DATA IN MOBILE NETWORK NODES

(75) Inventors: Marc Danzeisen, Ittigen (CH); Beat Perny, Kleinboesingen (CH); Roger Lagadec, Regensdorf (CH); Jan Linder, Bern (CH)

(73) Assignee: Swisscom AG, Bern (CH)

( * ) Notice: Subject to any disclaimer, the term of this patent is extended or adjusted under 35 U.S.C. 154(b) by 737 days.

(21) Appl. No.: 11/813,916

(22) PCT Filed: Jan. 14, 2005

(86) PCT No.: PCT/EP2005/050153
§ 371 (c)(1),
(2), (4) Date: Jul. 13, 2007

(87) PCT Pub. No.: WO2006/074827
PCT Pub. Date: Jul. 20, 2006

(65) Prior Publication Data
US 2009/0227272 A1    Sep. 10, 2009

(51) Int. Cl.
*H04W 4/00* (2009.01)
(52) U.S. Cl. ........................................ 455/466; 455/410
(58) Field of Classification Search .................. 455/410, 455/411, 412.2, 435.1, 466; 370/338, 351, 370/437, 465, 469
See application file for complete search history.

(56) References Cited

U.S. PATENT DOCUMENTS
2002/0123328 A1    9/2002  Snip et al.
2003/0081579 A1*   5/2003  Tosey et al. ................. 370/338
2003/0125052 A1*   7/2003  Jou .............................. 455/466

FOREIGN PATENT DOCUMENTS
EP      1 492 364       12/2004
WO      03 039103       5/2003

* cited by examiner

*Primary Examiner* — Sam Bhattacharya
(74) *Attorney, Agent, or Firm* — Oblon, Spivak, McClelland, Maier & Neustadt, L.L.P.

(57) ABSTRACT

A method and a system for data transmission with mobile network nodes, which include at least two network interfaces with corresponding power consumption. A central unit is configured to receive data intended for the mobile network, and a first network interface of the mobile network node is deactivated. If the central unit receives data intended for the mobile network node, a signaling message assigned to the received data is transmitted to the mobile network node, by a signaling module, via a second network interface of the mobile network node. Based on the transmitted signaling message, the first network interface of the mobile network node is activated, and data, which are intended for the mobile network node, are transmitted via the first network interface to the mobile network node.

18 Claims, 1 Drawing Sheet

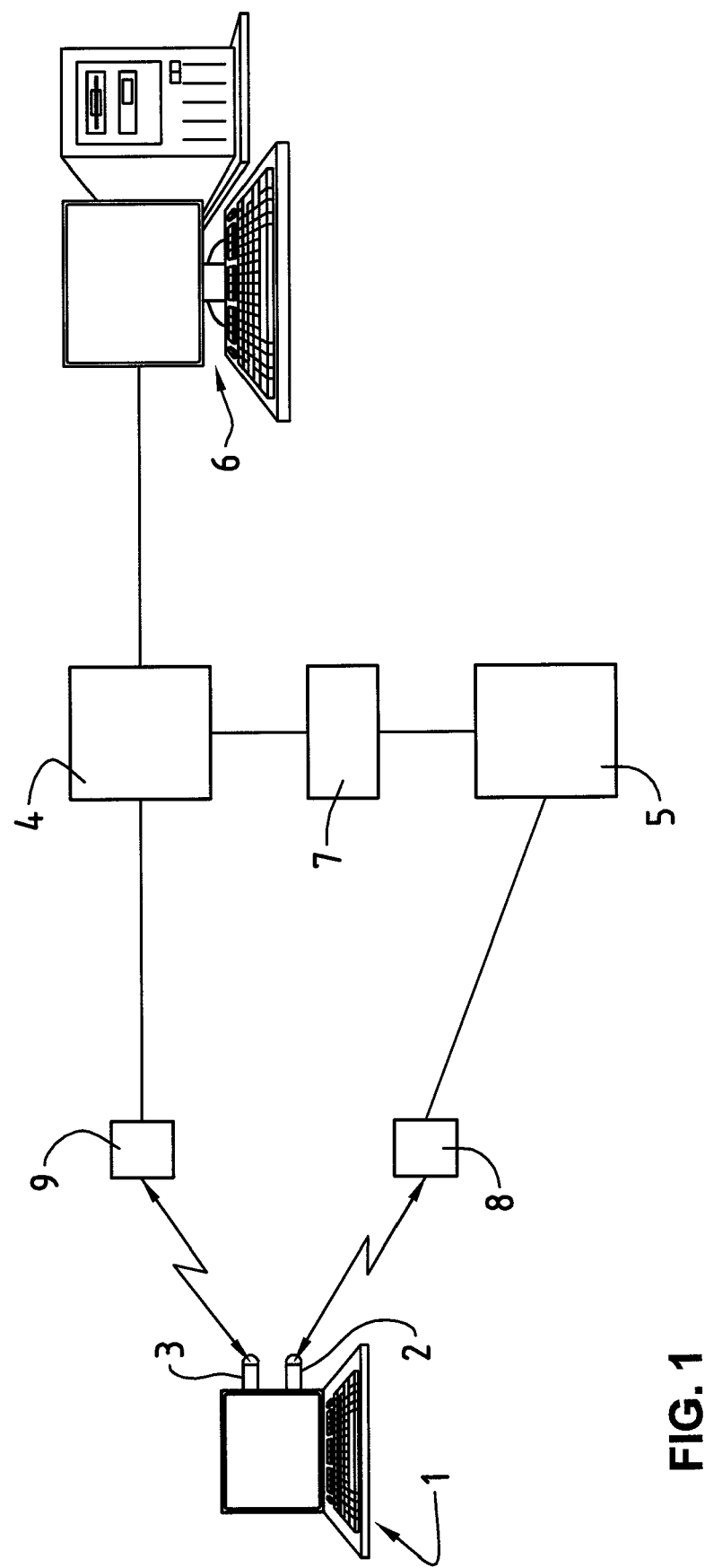

METHOD AND SYSTEM FOR TRANSMITTING DATA IN MOBILE NETWORK NODES

TECHNICAL FIELD

The present invention relates to a method and a system for data transmission with mobile network nodes. The invention relates in particular to a method and a system for data transmission with mobile network nodes comprising a multiplicity of network interfaces with corresponding power consumption.

BACKGROUND ART

The need for data transmission between network nodes as well as the quantity of data transmitted between network nodes continues to increase with a very high rate of growth. The growth is based, on the one hand, on the increasing number of network nodes such as, for example, fixed installed or mobile computer systems. On the other hand, the growth is based on the larger and larger quantities of data, such as in particular multimedia data. Such data comprise e.g. digital data such as texts, graphics, pictures, animations, sound recordings or video recordings. Belonging thereto are in particular also sound and video data, according to the MPx (e.g. MP3) or MPEGx (e.g. MPEG7) standards, for example, as they are defined by the Moving Picture Experts Group (MPEG), or picture data such as, for instance, according to the PNG standard (PNG: Portable Network Graphics), which is defined in the RFC 2083 (RFC: Request for Comments) of the IETF (Internet Engineering Task Force). Thus, for example, by means of a digital photo camera, first picture data are captured by a first network node, shown, and, if need be, processed. Then these picture data or parts of these picture data are transmitted via a communication link to a second network node, the picture data being stored, shown and if need be further processed on the second network node. Used as communication networks for transmission of data are e.g. a LAN (Local Area Network), a WAN (Wide Area Network) or the Internet via e.g. a public switched telephone network (PSTN: Public Switched Telephone Network), via a mobile radio network (PLMN: Public Land Mobile Network) such as e.g. a GSM or a UMTS network (GSM: Global System for Mobile Communication, UMTS: Universal Mobile Telephone System) or via a WLAN (Wireless Local Area Network).

In the last few years, mobility, and with it, the number of mobile network users has likewise increased sharply, in particular the number of mobile Internet users. The growing offer in IP-capable (IP: Internet Protocol) mobile devices, such as e.g. PDAs (PDA: Personal Digital Assistant), mobile radio telephones or laptops, goes hand in hand with this development. The transition from fixed network nodes to more flexible demands through increased mobility has only just begun. In mobile radio telephony, for example, this tendency also shows itself in, among other things, new standards such as GPRS (General Packet Radio Services), EDGE (Enhanced Data GSM Environment), UMTS (Universal Mobile Telecommunications Service), HSDPA (High-Speed Downlink Packet Access) or HSUPA (High-Speed Uplink Packet Access). Mobile computer use distinguishes itself in many ways from computer use and network capability in fixed networks. For mobile network use, a mobile network node has today at its disposal various network interfaces for connection of the mobile network node to different communication networks. The different network interfaces thereby also have different performance features such as, for example, different data transmission rates, bit error rates, availabilities, or a different energy consumption. Thus, for instance, a GSM based mobile radio network is characterized in particular by a high, location-independent availability, the network interface for connection to a GSM based mobile radio network has a relatively minimal data transmission rate and a relatively minimal energy consumption. In contrast, the connection via a WLAN network interface is only possible at locations with corresponding WLAN access points, the WLAN network interface having a relatively high data transmission rate and a relatively high energy consumption. Finally, a UMTS network is characterized, for example, by a more and more location-independent availability, the UMTS network interface having a relatively high data transmission rate and a relatively high energy consumption. The available network interfaces of a network node are often activated at the same time independently of an actual data transmission. This leads to too high an energy consumption, however, which is undesirable, in particular for locations without electrical power socket for the energy supply of the mobile network node. However, the mobile network nodes normally have means to switch off a network interface manually or automatically, for example if a monitoring module detects that a network interface remains unused for a certain interval of time. A manual switching off has the drawback that the user has to activate the network interface again manually before a data transmission. For an automated data transmission, such as, for example, for the automated download of e-mail messages by an e-mail client of the mobile network nodes, it is difficult, however, to active a corresponding network interface at the correct points in time manually, and, if need be, deactivate it again. On the other hand, with an automatic switching off of a network interface, this network interface is typically also automatically activated again, as soon as an application of the network node attempts to access a network or a second network node. This has the drawback, however, that with an accessing of an application of the network node on a central unit, the network interface is often unnecessarily activated, such as, for example, when accessing an e-mail server by an e-mail client of the mobile network node to check the status of the e-mail account. A further disadvantage of the state of the art is that a deactivated network interface, which is configured, for example, for receiving data that require a high data transmission rate, is no longer accessible from a second network node. Thus, for example, for a video telephony application of a second network node, it is no longer possible to accomplish a call to a mobile network node with a deactivated network interface, but one configured however for receiving a video telephony call.

DISCLOSURE OF INVENTION

It is an object of the present invention to propose a new method and a new system for data transmission with mobile network nodes, which do not have the drawbacks of the state of the art. The new method and the new system should improve in particular the data transmission with mobile network nodes with a multiplicity of network interfaces with corresponding power consumption.

These objects are achieved in particular through the elements of the independent claims. Further advantageous embodiments follow moreover from the dependent claims and the description.

In particular, these objects are achieved through the invention in that for data transmission with a mobile network node having at least two network interfaces with corresponding power consumption, a central unit is configured for the receiving of data intended for the network node, a first network interface of the mobile network node being deactivated, whereby, if the central unit receives data, which are intended for the mobile network node, a signalling message assigned to the received data is transmitted to the mobile network node by means of a signalling module via a second network interface of the mobile network node, the first network interface of the mobile network node being activated based on the transmitted signalling message, and data, which are intended for the mobile network node being transmitted to the mobile network node via the first network interface. Such a method has in particular the advantage that, with mobile network nodes, an energy-efficient data transmission with high data transmission rate is made possible, in that, for example, usable as the second network interface is a network interface with relatively minimal power consumption such as, for example, a GSM interface, and in that usable as the first network interface is, for example, a network interface with a relatively high data transmission rate, such as, for example, a UMTS interface, and a data transmission with the mobile network node with both a relatively high data transmission rate and a relatively minimal power consumption being feasible.

In an embodiment variant, configured as the central unit is an e-mail server for receiving e-mail messages intended for the mobile network node. Such a method has in particular the advantage that an energy-efficient data transfer rate is made possible in that, for example, used as the first network interface is a network interface with a relatively high data transmission rate and a relatively high power consumption, and in that the first network interface with the relatively high power consumption is only activated for the first time when e-mail messages are available intended for the mobile network node.

In a further embodiment variant, configured as the central unit is a network switching module with a definable IP address for receiving IP packets intended for the mobile network node. By means of the network switching module, the receipt of IP packets intended for the mobile network node is detectable, the network switching module triggering, upon detection of such IP packets, the transmission of a corresponding signalling message by means of the signalling module. Such a method has in particular the advantage that an energy-efficient data transmission with high data transmission rate is made possible in that, for example, usable as the first network interface is a network interface with a relatively high data transmission rate and a relatively high power consumption and in that the first network interface is able to be activated automatically as soon as IP packets arrive at the network switching module which are intended for the mobile network node.

In another embodiment variant, data which are intended for the mobile network node are stored in the central unit after receipt of the data by the central unit. Such a method has in particular the advantage that the data intended for the mobile network node also then remain available if a longer interval of time is needed for the activation of the first network interface.

In a further embodiment variant, used as the signalling message assigned to the received data is a USSD message and/or SMS message generated by a USSD server (USSD: Unstructured Supplementary Service Data) and/or SMS server (SMS: Short Message Service) and transmittable via a constantly available GSM interface of the mobile network node. Such a method has in particular the advantage that usable as the second network interface is a network interface with a relatively minimal power consumption and a relatively high availability.

In a further embodiment variant, based on the transmitted signalling message a UMTS network interface and/or a WLAN network interface of the mobile network node is activated. Such a method has in particular the advantage that communication links with a high data transmission rate are usable, which are widespread both in relation to the mobile network nodes as well as in relation to the locations for which such communication links are accessible.

In another embodiment variant, based on data of the signalling message, the mobile network node is activated out of a rest mode. Such a method has in particular the advantage that in a rest mode of the mobile network node, only those modules of the mobile network node necessary for receiving the signalling message are activated, and thus the power consumption of the mobile network node is able to be additionally reduced.

In another embodiment variant, after activation of the first network interface, the transmission of data via the first network interface is monitored by means of a monitoring module, the first network interface being deactivated as soon as definable events are detected by the monitoring module. Such a method has in particular the advantage that the first network interface is able to be deactivated, and thus the energy consumption is able to be reduced on the mobile network node, as soon as it is detected, for example, that no communication network corresponding to the network interface is available.

In a further embodiment variant, after activation of the first network interface, the transmission of data via the first network interface is monitored by means of a monitoring module, the first network interface being deactivated as soon as it is detected by the monitoring module that during a definable time interval no data transmission has taken place. Such a method has in particular the advantage that, if the network interface is not used for any data transmission during a definable interval of time, the first network interface is able to be deactivated, and thus the energy consumption is able to be further reduced.

BRIEF DESCRIPTION OF THE DRAWING

Embodiment variants of the present invention will be described in the following with reference to examples. The examples of the embodiments are illustrated by the following attached FIGURE:

FIG. 1 shows a block diagram representing schematically a system for data transmission with mobile network nodes.

BEST MODES FOR CARRYING OUT THE INVENTION

In FIG. 1, the reference numeral 1 refers to a mobile network node such as, for example, a portable personal computer such as a laptop or a PDA (Personal Digital Assistant), a mobile radio telephone or any other mobile network node. The mobile network node comprises a multiplicity of network interfaces 2,3 such as, for example, a network interface according to the GSM standard, the UMTS standard, an 802.x WLAN standard such as an 802.11, 802.15, 802.16, 802.20, etc. standard or the Bluetooth standard. The method according to the invention is in particular advantageous with the use of a mobile network node at locations with radio-based communication networks such as, for example, railway stations, airports, trains, taxis, restaurants, hotels or any other location with an access to a radio-based communication network. The method according to the invention also relates, however, to the use of a mobile network node at locations with wire-based communication networks such as, for example, an Ethernet network, an ADSL access (ADSL: Asymmetric Digital Subscriber Line) or any other access to a wire-based communication network. The access of the mobile network node to a communications network takes place alternatively via one of the network interfaces 2,3 of the mobile network node. Thus, in addition to a modem for access to communication networks via a PSTN (PSTN: Public Switched Telephone Network) modern portable personal computer nowadays comprise at the same time, for example, also network interfaces according to the Ethernet standard, the 802.x WLAN standard, the Bluetooth standard or the IrDA standard (IrDA: Infrared Data Association). At the same time, modern portable personal computers allow themselves to be equipped by means of suitable extension cards with additional network interfaces for access to further communication networks such as, for example, a mobile radio network according to the GSM standard, a mobile radio network according to the UMTS standard or any other further communication network. The method according to the invention is in particular advantageous with use of an extension card which comprises a network interface in each case for access to a communication network according to the GSM standard, according to the UMTS standard as well as to the 802.x WLAN standard.

The network interfaces of the mobile network node distinguish themselves in particular through different performance features. Thus a network interface according to the GSM standard has a minimal power consumption, but a high, location-independent availability. A data transmission via a network interface according to the GSM standard takes place, however, only with a limited data transmission rate. If not otherwise designated, the network interface 2 refers in the following to a network interface for access to a communication network according to the GSM standard. In contrast, a network interface according to the UMTS or the 802.x WLAN standard for data transmission achieves a high data transmission rate. A network interface according to the UMTS or the 802.x WLAN standard has a high power consumption, however, and in particular for a network interface according to the 802.x WLAN standard only a limited, location-dependent availability. If not otherwise designated, the network 3 refers in the following to a network interface for access to a communication network according to the UMTS standard or the 802.x WLAN standard.

The reference numeral 8 in FIG. 1 refers, for example, to a base station of a communication network according to the GSM standard, and the reference numeral 9 refers, for example, to a base station of a communication network according to the UMTS standard or to an Access Point of a communication network according to the 802.x WLAN standard. The reference numeral 4 in FIG. 1 refers to a central unit which is configured for receiving data intended for the mobile network node 1. The reference numeral 6 refers to any fixed or mobile network node which transmits data to the mobile network node 1. The reference numeral 5 refers to a signalling module such as, for example, an SMS server or a USSD server. The reference numeral 7 refers to an interface between the central unit 4 and the signalling module 5 for control of the signalling module 5 by the central unit 4. With the interface 7, in particular the control of the signalling unit 5 of a communication network according to the GSM Standard is made possible by a central unit 4 of a communication network according to the IP protocol. Depending upon embodiment, the interface 7 is able to be integrated in the signalling unit 5 or in the central unit 4.

In an embodiment variant, the central unit 4 refers to an e-mail server. The mobile network node 1 comprises an e-mail client which is configured for the receipt of e-mail messages intended for the e-mail client. The configuration of the e-mail client comprises in particular the host name or the IP address of the e-mail server. E-mail clients are often configured such that they check the e-mail server for new e-mail messages at definable points in time, for example after expiration of a definable time interval, by means of a request of the POP protocol (POP: Post Office Protocol) or of the IMAP protocol (IMAP: Internet Message Access Protocol). Thus it is necessary that IP protocol based data packets are exchanged, for example via the network interface 3 between the mobile network node 1 and the central unit 4, whereby in the state of the art the network interface 3 remains constantly active, for example, or is automatically activated, for example, if no new e-mail messages at all have arrived at the e-mail server. Such a use of the network interface 3 leads, however, to an unnecessary use of energy. According to the invention, stored on the e-mail server is, for example, an e-mail address as well as the address of the mobile network node 1, for example the number of a GSM interface of the mobile network node 1, whereby an e-mail monitoring module then analyzes e-mail messages which arrive at the e-mail server, for example through analysis of the to: header line of the incoming e-mail messages on the e-mail server according to the SMTP protocol (SMTP: Simple Mail Transfer Protocol), this e-mail monitoring module triggering a corresponding signalling message to the mobile network node upon arrival of an e-mail message intended for the e-mail client of the mobile network node 1 by means of the stored address of the mobile network node 1 and by means of the interface 7. Such a configuration is implemented, for example, by the administrator of the e-mail server, or e.g., via a suitable interface of the e-mail server and a suitable configuration module of the mobile network node, by the mobile network node. The first network interface 3 is then deactivated, for example by means of a data transmission monitoring module of the mobile network node, the data transmission monitoring module checking whether the first network interface 3 is used for a data transmission, and the data transmission monitoring module deactivating the first network interface 3 as soon as the latter has not been used for any data transmission for a definable time interval. The network node 6 now sends to the e-mail server an e-mail message intended for the e-mail-client of the mobile network node 1. As soon as it is detected on the e-mail server that an e-mail message intended for the e-mail client of the mobile network node has been received, a corresponding message, for example an SNMP message (SNMP: Simple Network Management Protocol), is transmitted to the interface 7 by the e-mail monitoring module configured on the e-mail server. The interface 7 analyzes the SNMP message, and generates a message for corresponding control of the signalling module 5, for example a message according to the SS7 standard (SS7: Signalling System No. 7). The signalling module 5 transmits a signalling message to the mobile network node 1, for example a USSD message or a SMS message, via the base station 8, for example a base station of a communication network according to the GSM standard, and the network interface 2, for example a network interface for access to a communication network according to the GSM standard, of the mobile network node. The signalling message is thereby constantly or quasi constantly transmittable via the network interface 2, i.e. as soon as the network interface 2 is registered with a base station 8. Configured on the mobile network node is a module for evaluation of the signalling message as well as for control of the network interfaces of the mobile network node according to the signalling message. As described, the signalling message is, for example, an SMS message, and comprises, for example, data for identification of the e-mail client of the mobile network node. The module for evaluation of the signalling message first verifies, for instance, whether the e-mail client specified in the signalling message is really there on the mobile network node, then activates the network interface 3, and finally asks this e-mail client of the mobile network node, to access the e-mail server for receiving e-mail messages intended for the e-mail client, after completion of this access the network interface 3 being deactivated by the e-mail client, for example.

The download of an e-mail message can take place stepwise. Thus, in a first step, only header information can be downloaded, and only in a second step the content of the e-mail message. The stepwise download is <sic.> makes possible a further reduction of the power consumption, and is advantageous in particular also with use of a multiplicity of network devices. Thus the signalling message can first be transmitted, for example, to a first network device, for example to a mobile radio terminal with a constantly available GSM network interface. Based on the signalling message, a user of the mobile radio terminal can request, for example, the download of header information, for example the download of the subject: line, on the mobile radio terminal, the download via the GSM network interface of the mobile radio terminal being feasible. Then, by means of the mobile radio terminal, the user can initiate the download of the content of the e-mail message on a second network device, for example on a laptop with a deactivated WLAN interface, for example by means of a corresponding message which is transmitted via an interface, for example a Bluetooth interface, between the mobile radio terminal and the laptop.

In another embodiment variant, the central unit 4 refers to a network switching module with a constantly accessible public IP address. The network switching module thereby acts as switching unit between the public IP address and the network interface 3. If the network interface 3 is activated, then the network switching module acts, for example, like an NAT device (NAT: Network Address Translation), IP data packets received by the public IP address being transmitted for example via a tunnel connection from the network switching module to the network interface 3, and IP packets sent by the network interface 3 being transmitted for example via this tunnel connection to the network switching module and to further network nodes. The network switching module is implemented, for example, as a software module, for example as a Java software module of a network server, or, for example, as a hardware module with suitably wired logic components, the network switching module exchanging both data with the Internet as well as data with the base station 9 or respectively the network interface 3 and the interface 7. The data transmission thereby takes place between the network switching module and said further interfaces based, for example, on the IP protocol. The configuration of the network switching modules takes place, for example, through an administrator of the network server or also, however, via suitable interfaces, through the mobile network nodes 1, and comprises, for instance, the storing of an address of the mobile network node 1, for example the number of a GSM network interface of the mobile network node 1. The first network interface 3 is deactivated, for example, as soon as it is detected by means of a data transmission monitoring module of the mobile network node 1, that the network interface 3 has not been used for any data transmission during a definable time interval. As soon as the network switching module receives IP packets, which are addressed to the public IP address of the network switching module, for example IP packets which are sent by the network node 6 to the public IP address of the network switching module, a signalling message is transmitted by the network switching module, for example an SNMP message, to the interface 7. The interface 7 analyzes the signalling message, for example the SNMP message, and generates a message for corresponding control of the signalling module 5, for example a message according to the SS7 standard. The signalling module 5 transmits to the mobile network node a signalling message, for example a USSD message or an SMS message, via the base station 8, for example a base station of a communication network according to the GSM standard, and the network interface 2, for example a network interface for access to a communication network according to the GSM standard, of the mobile network node. The signalling message comprises, for example, the IP address of the network node 6 as well as a port address, to which the network node 6 sends data. A module of the mobile network node 1 for evaluation of the signalling message first verifies, for example, that a suitable application on the mobile network node 1 for receiving the IP packets sent by the network node 6 is ready for operation, or, if necessary, first starts such a suitable application, for example a video telephony application. The module for evaluation of the signalling message activates the network interface 3, a connection between the network interface 3 and the network switching module initiate <sic. is initiated>, and the network switching module for the transmission of IP data packets sent from the network node 6 to the public IP address of the network switching module configure <sic. is configured>. The network switching module can also comprise in particular a home agent according to the mobile IP standard (IETF RFC 2002, October 1996 and RFC 3220, January 2002, IETF: Internet Engineering Task Force, RFC: Request for Comments). For example, after the receipt of a corresponding signalling message, the network interface 3 of the mobile network node is configured with an IP address, for example with an IP address of a WLAN network, and according to the mobile IP standard is transmitted as care-of address to the home agent.

For the method according to the invention, no explicit communication is required between the central unit 4 and the network node 6, such as, for example, a status query in relation to the mobile network node 1, for carrying out the method for data transmission between the network node 6 and the mobile network node 1, i.e. the method according to the invention is completely transparent for the network node 6. In an embodiment variant, the method according to the invention comprises an explicit communication, i.e. the network node 6 comprises, for example, a software module for explicit triggering of a signalling message for activating a network interface 3 of the mobile network node 1 as well as, for example, also for carrying out a data transmission via the activated network interface 3.

It is important to note that the network interfaces 2,3 of the mobile network nodes 1 to integrate <sic. may be integrated>, for example, in a single network card according to the so-called PC card standard. Modules of the mobile network node for carrying out the method according to the invention or for achieving the system according to the invention are also integrated, for example, in these network cards, for instance as software modules, as firmware modules or as hardware modules. Thus the mobile network node, for example a laptop computer, allows itself to be put in a rest mode, only the network card being supplied with energy by the battery of the mobile network node, and, for example, only one GSM network interface 2 of the network card and the module for evaluating signalling messages remaining activated. Thus the mobile network node is able to be activated, for example, via an APM interface (APM: Advanced Power Management), as soon as a corresponding signalling message is received from the network interface 2. With such a method and system, a further reduction of the power consumption is achieved. With this method and system, definable applications of the mobile network node can also be put into a rest mode, for example in that definable first applications are put in a rest mode and only selectable second applications remain active, for example an e-mail client or a video telephony application. If only definable applications of the mobile network node are put in a rest mode, then in particular calls to a video telephony application are able to be answered with a smaller response delay.

The power consumption of a network interface of the mobile network node 1 can be further optimized through a software module connected between the operating system, as well as the applications, of the mobile network node 1 and the network interface 3, so that the operating system or applications do not access directly network interfaces of the mobile network node, but only via the software module inserted between. By means of such a software module, in accordance with specifiable filter rules, IP packets are intelligently routed, transmitted dynamically to different network interfaces, or suppressed. Thus, for example, a request for checking the status of an e-mail account can be conducted via an energy-saving but narrow-band network interface, whereby it is ensured that a network interface with an energy-saving standby mode, such as, for example, a UMTS network interface, is not unnecessarily taken out of the standby mode into an activated mode with a higher power consumption.

The invention claimed is:

1. A method for data transmission with mobile network nodes, a mobile network node including at least two network interfaces with corresponding power consumption, the method comprising:

storing an address assigned to a mobile network node in a central unit;

deactivating a first network interface of the mobile network node;

transmitting, when the central unit receives data intended for the mobile network node, a signaling message assigned to the received data to the mobile network node by a signaling module via a second network interface of the mobile network node;

activating, based on the transmitted signaling message, the first network interface of the mobile network node;

transmitting data intended for the mobile network node to the mobile network node via the first network interface; and monitoring, at a monitoring module of the mobile network node, data transmission via the first network interface and deactivating the first network interface based on the monitoring, wherein the data intended for the mobile network node is stored in the central unit after receipt by the central unit.

2. The method according to claim 1, wherein an e-mail server for receiving e-mail messages intended for the mobile network node is used as the central unit, an e-mail address of an e-mail client of the mobile network node and an address of the mobile network node being stored in the central unit.

3. The method according to claim 1, wherein a network switching module with a definable IP address for receiving IP packets intended for the mobile network node is used as the central unit, an address for the mobile network node being stored in the network switching module.

4. The method according to claim 1, wherein a USSD message and/or SMS message generated by a USSD server and/or SMS server and transmittable via a constantly available GSM interface of the mobile network node are used as the signaling message assigned to the received data.

5. The method according to claim 1, wherein based on the transmitted signaling message a UMTS network interface and/or a WLAN network interface of the mobile network node is activated.

6. The method according to claim 1, wherein based on data of the signaling message the activating the first network interface is signaled to at least one software module of the mobile network node.

7. The method according to claim 1, wherein based on data of the signaling message, the mobile network node is activated out of a rest mode.

8. The method according to claim 1, wherein the first network interface is deactivated as soon as it is detected by the monitoring module that during a definable time interval no data transmission has taken place via the first network interface.

9. A system for data transmission with mobile network nodes, a mobile network node including at least two network interfaces with corresponding power consumption, the system comprising:

a central unit configured to receive data intended for the mobile network node and store the received data in a storing unit of the central unit;

means for deactivating a first network interface of the mobile network node;

a signaling module configured to, when the central unit receives data intended for the mobile network node, transmit a signaling message assigned to the received data to the mobile network node, by the signaling module, via a second network interface of the mobile network node;

means for activation of the first network interface of the mobile network node based on the transmitted signaling message; and means for data transmission, via the first network interface, of data which is intended for the mobile network node, wherein the mobile network node includes a first monitoring module configured to monitor data transmission via the first network interface, and the means for deactivating deactivates the first network interface based on the monitoring in the first monitoring module.

10. The system according to claim 9, wherein the central unit comprises an e-mail server for receiving e-mail messages intended for the mobile network node.

11. The system according to claim 9, wherein the central unit comprises a network switching module with a definable IP address for receiving IP packets intended for the mobile network node.

12. The system according to claim 9, wherein the signaling module comprises a USSD server and/or an SMS server for transmitting a USSD message and/or an SMS message to a constantly available GSM interface of the mobile network node.

13. The system according to claim 9, wherein the system further comprises means for signaling a software module of the mobile network node the activation of the first network interface.

14. The system according to claim 9, wherein the system further comprises means for activating the mobile network node out of a rest mode based on data of the signaling message.

15. The system according to claim 9, wherein the first network interface is configured to be deactivated by the means for deactivating as soon as it is detected by the first monitoring module that no data transmission via the first network interface has taken place during a definable time interval.

16. The method according to claim 1, further comprising monitoring data received at the central unit to determine whether the received data is data intended for the mobile network node.

17. The system according to claim 9, further comprising, a second monitoring module configured to monitor data received at the central unit to determine whether the received data is data intended for the mobile network node.

18. A system for data transmission with mobile network nodes, a mobile network node including at least two network interfaces with corresponding power consumption, the system comprising:
- a central unit configured to receive data intended for the mobile network node and store the received data in a storing unit of the central unit;
- a deactivation unit configured to deactivate a first network interface of the mobile network node;
- a signaling module configured to, when the central unit receives data intended for the mobile network node, transmit a signaling message assigned to the received data to the mobile network node, by the signaling module, via a second network interface of the mobile network node;
- a first activation unit configured to activate the first network interface of the mobile network node based on the transmitted signaling message; and
- a transmission unit configured to transmit, via the first network interface, data which is intended for the mobile network node,
- wherein the mobile network node includes a first monitoring module configured to monitor data transmission via the first network interface, and
- the deactivation unit deactivates the first network interface based on the monitoring in the first monitoring module.

* * * * *